US012649385B2

(12) United States Patent
Xiong et al.

(10) Patent No.: US 12,649,385 B2
(45) Date of Patent: Jun. 9, 2026

(54) BATTERY CIRCUIT AND VEHICLE

(71) Applicant: BYD Company Ltd., Shenzhen (CN)

(72) Inventors: Shi Xiong, Shenzhen (CN); Tianyu Feng, Shenzhen (CN); Linwang Deng, Shenzhen (CN)

(73) Assignee: BYD Company Ltd., Shenzhen (CN)

( * ) Notice: Subject to any disclaimer, the term of this patent is extended or adjusted under 35 U.S.C. 154(b) by 0 days.

(21) Appl. No.: 18/917,397

(22) Filed: Oct. 16, 2024

(65) Prior Publication Data

US 2025/0033526 A1 Jan. 30, 2025

Related U.S. Application Data

(63) Continuation of application No. PCT/CN2023/079719, filed on Mar. 6, 2023.

(30) Foreign Application Priority Data

May 31, 2022 (CN) .......................... 202210614132.8

(51) Int. Cl.
B60L 58/19 (2019.01)
B60L 58/21 (2019.01)
(Continued)

(52) U.S. Cl.
CPC ............... B60L 58/19 (2019.02); B60L 58/21 (2019.02); H01M 10/4264 (2013.01);
(Continued)

(58) Field of Classification Search
CPC .......... B60L 58/19; B60L 58/21; B60L 58/22; B60L 2240/547; B60L 58/10;
(Continued)

(56) References Cited

U.S. PATENT DOCUMENTS

| | | |
|---|---|---|
| 2003/0029654 A1 | 2/2003 | Shimane et al. |
| 2013/0127398 A1 | 5/2013 | Xu et al. |
| 2019/0160972 A1 | 5/2019 | Zeiler et al. |

FOREIGN PATENT DOCUMENTS

| | | |
|---|---|---|
| CN | 107112776 A | 8/2017 |
| CN | 209823441 U | 12/2019 |

(Continued)

OTHER PUBLICATIONS

Jul. 1, 20242 - (CN) Written Opinion Search Report - App. No. 202210611784.6 w/ Machine Translation.
(Continued)

*Primary Examiner* — Elim Ortiz
(74) *Attorney, Agent, or Firm* — Banner & Witcoff, Ltd.

(57) ABSTRACT

A battery circuit, comprising a power supply terminal, a first battery pack, a second battery pack, a voltage transformation unit, a first switch, a second switch and a grounding terminal, wherein a positive electrode of the first battery pack is connected to the power supply terminal, and a negative electrode thereof is connected to a positive electrode of the second battery pack; a negative electrode of the second battery pack is connected to the grounding terminal; a first terminal of the first switch is connected to the power supply terminal, and a second terminal thereof is connected to a first terminal of the second switch; a second terminal of the second switch is connected to the grounding terminal; the voltage transformation unit is connected between the first battery pack and the first switch. Also disclosed is a vehicle comprising the battery circuit.

20 Claims, 4 Drawing Sheets

(51) Int. Cl.
　　H01M 10/42　　　(2006.01)
　　H01M 10/46　　　(2006.01)
　　H02J 7/34　　　(2006.01)

(52) U.S. Cl.
　　CPC ............. H01M 10/46 (2013.01); H02J 7/342
　　　　　(2020.01); *H01M 2220/20* (2013.01)

(58) Field of Classification Search
　　CPC ... B60L 58/18; H01M 10/4264; H01M 10/46;
　　　　　H01M 2220/20; H01M 10/425; H01M
　　　　　10/441; H02J 7/342; H02J 2207/20; H02J
　　　　　7/00; H02J 7/0024; H02J 7/0013; H02J
　　　　　7/0029; B60Y 2200/91; Y02T 10/70;
　　　　　Y02T 10/7072; Y02T 10/72
　　See application file for complete search history.

(56)　　　　　　References Cited

FOREIGN PATENT DOCUMENTS

| | | | | | |
|---|---|---|---|---|---|
| CN | 111422100 | A | | 7/2020 | |
| CN | 112677821 | A | | 4/2021 | |
| CN | 112848969 | A | | 5/2021 | |
| CN | 113696785 | A | * | 11/2021 | .............. B60L 58/13 |
| CN | 113824168 | A | | 12/2021 | |
| CN | 113939970 | A | | 1/2022 | |
| JP | 2010057291 | A | | 3/2010 | |

OTHER PUBLICATIONS

Sep. 14, 2024—(CN) Written Opinion and Search Report—App.
No. 202210611784.6 w/ Machine Translation.

* cited by examiner

BATTERY CIRCUIT AND VEHICLE

CROSS-REFERENCE TO RELATED APPLICATIONS

This Application is a Continuation of Application PCT/CN2023/079719 filed on Mar. 6, 2023. Application PCT/CN2023/079719 claims priority to Chinese Patent Application No. 202210614132.8, filed on May 31, 2022 and entitled "BATTERY CIRCUIT AND VEHICLE". The above applications are incorporated herein by reference in their entirety.

FIELD

The present disclosure relates to the technical field of vehicles, and more specifically, to a battery circuit and a vehicle including the battery circuit.

BACKGROUND

In the related art, a dual battery pack including a power-type battery pack and an energy-type battery pack is provided.

How to provide a hardware foundation for controlling the dual battery pack including the power-type battery pack and the energy-type battery pack becomes a pressing technical problem that needs to be addressed.

SUMMARY

The present disclosure is intended to provide a new technical solution for a battery circuit.

According to a first aspect of the present disclosure, a battery circuit is provided, which includes a power supply terminal, a first battery pack, a second battery pack of a different type from the first battery pack, a voltage transformation unit, a first switch, a second switch, and a grounding terminal.

A positive electrode of the first battery pack is connected with the power supply terminal. A negative electrode of the first battery pack is connected with a positive electrode of the second battery pack.

A negative electrode of the second battery pack is connected with the grounding terminal.

A first terminal of the first switch is connected with the power supply terminal. A second terminal of the first switch is connected with a first terminal of the second switch.

A second terminal of the second switch is connected with the grounding terminal.

A voltage transformation unit is connected between the negative electrode of the first battery pack and the second terminal of the first switch.

A deviation between a rated voltage of the first battery pack and a rated voltage of the second battery pack is less than a first preset range; and/or a deviation between a ratio of a capacity of the first battery pack to a capacity of the second battery pack and a ratio of a maximum discharge rate of the second battery pack to a maximum discharge rate of the first battery pack is less than a second preset range.

According to an embodiment of the present disclosure, the rated voltage of the first battery pack is the same as the rated voltage of the second battery pack; and/or the ratio of the capacity of the first battery pack to the capacity of the second battery pack is the same as the ratio of the maximum discharge rate of the second battery pack to the maximum discharge rate of the first battery pack.

According to an embodiment of the present disclosure, the battery circuit further includes a control unit. A first terminal of the control unit is connected with a control terminal of the first switch. A second terminal of the control unit is connected with a control terminal of the second switch.

The control unit is configured to: control the first switch and the second switch to be opened or closed according to a first preset control rule under a first preset condition, to cause an output power of the second battery pack to increase; and/or control the first switch and the second switch to be opened or closed according to a second preset control rule under a second preset condition, so that an input power of the first battery pack is different from an input power of the second battery pack; and/or control the first switch and the second switch to be opened or closed according to a third preset control rule under a third preset condition, to cause the first battery pack to charge the second battery pack or cause the second battery pack to charge the first battery pack; and/or control the first switch and the second switch to be opened under a fourth preset condition, to connect the first battery pack and the second battery pack in series for discharging or charging.

According to an embodiment of the present disclosure, the first battery pack comprises a power-type battery pack; and the second battery pack comprises an energy-type battery pack; or the first battery pack comprises an energy-type battery pack; and the second battery pack comprises a power-type battery pack.

According to an embodiment of the present disclosure, the first battery pack comprises is a power-type battery pack, and the second battery pack comprises an energy-type battery pack. The battery circuit further includes a filtering unit.

A first terminal of the filtering unit is connected with the positive electrode of the first battery pack. A second terminal of the filtering unit is connected with the power supply terminal. A third terminal of the filtering unit is connected with the negative electrode of the first battery pack.

According to an embodiment of the present disclosure, the filtering unit includes a first inductor and a first capacitor.

A first terminal of the first inductor is connected with the positive electrode of the first battery pack. A second terminal of the first inductor is connected with the power supply terminal.

A first terminal of the first capacitor is connected with the first terminal of the first inductor. A second terminal of the first capacitor is connected with the negative electrode of the first battery pack.

According to an embodiment of the present disclosure, the battery circuit further includes a first freewheeling unit and a second freewheeling unit.

An input terminal of the first freewheeling unit is connected with the second terminal of the first switch. An output terminal of the first freewheeling unit is connected with the first terminal of the first switch.

An input terminal of the second freewheeling unit is connected with the second terminal of the second switch. An output terminal of the second freewheeling unit is connected with the first terminal of the second switch.

According to an embodiment of the present disclosure, the first freewheeling unit is a first diode, and the second freewheeling unit is a second diode.

An anode of the first diode is connected with the second terminal of the first switch. A cathode of the first diode is connected with the first terminal of the first switch.

An anode of the second diode is connected with the second terminal of the second switch. A cathode of the second diode is connected with the first terminal of the second switch.

According to an embodiment of the present disclosure, the battery circuit further includes a voltage stabilization unit.

The voltage stabilization unit is connected between the power supply terminal and the grounding terminal.

According to an embodiment of the present disclosure, the voltage stabilization unit comprises a second capacitor.

According to an embodiment of the present disclosure, the voltage transformation unit comprises a second inductor.

According to a second aspect of the present disclosure, a vehicle is provided. The vehicle includes the battery circuit in any implementation of the foregoing first aspect.

According to the battery circuit in an embodiment of the present disclosure, a hardware circuit foundation is provided for controlling a dual battery pack including the first battery pack and the second battery pack.

Other features and advantages of the present disclosure will become clear from the following detailed description of exemplary embodiments of the present disclosure provided with reference to drawings.

BRIEF DESCRIPTION OF THE DRAWINGS

Drawings that are incorporated into and constitute a part of the specification illustrate embodiments of the present disclosure, and are used to explain the principle of the present disclosure together with the description thereof.

Figure 1:
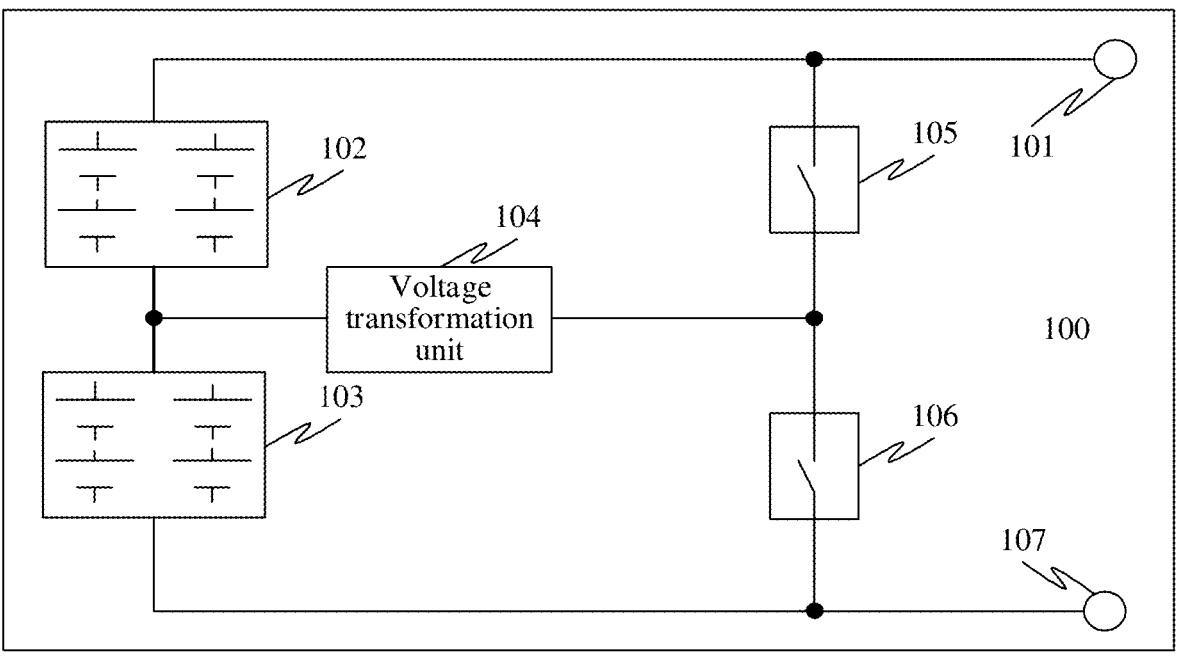
FIG. 1 is a schematic structural diagram I of a battery circuit according to an embodiment of the present disclosure.

In the drawings:
100—Battery circuit; 101—Power supply terminal; 102—First battery pack; 103—Second battery pack; 104—Voltage transformation unit; 1041—Second inductor; 105—First switch; 106—Second switch; 107—Grounding terminal; 108—Control unit; 109—Filtering unit; 1091—First inductor; 1092—First capacitor; 110—First freewheeling unit; 1101—First diode; 111—Second freewheeling unit; 1111—Second diode; 112—Voltage stabilization unit; 1121—Second capacitor.

DETAILED DESCRIPTION

Various exemplary embodiments of the present disclosure are described in detail with reference to drawings. It should be noted that, unless otherwise specified, relative arrangement, numerical expressions, and numerical values of components and steps described in the embodiments do not limit the scope of the present disclosure.

The following descriptions of at least one exemplary embodiment are merely illustrative, and in no way constitute any limitation on the present disclosure and the application or use thereof.

Technologies, methods, and devices known to a person of ordinary skill in the related art may not be discussed in detail, but where appropriate, the techniques, the methods, and the devices should be considered as a part of the specification.

In examples shown and discussed herein, any specific value should be construed as merely exemplary and not as a limitation. Therefore, other examples of the exemplary embodiments may have different values.

It should be noted that, similar reference numerals and letters represent similar items in the following drawings. Therefore, once an item is defined in a drawing, the item does not need to be further discussed in subsequent drawings.

An embodiment of the present disclosure provides a battery circuit 100. As shown in FIG. 1, the battery circuit 100 includes a power supply terminal 101, a first battery pack 102, a second battery pack 103 of a different type from the first battery pack 102, a voltage transformation unit 104, a first switch 105, a second switch 106, and a grounding terminal 107.

A positive electrode of the first battery pack 102 is connected with the power supply terminal 101. A negative electrode of the first battery pack 102 is connected with a positive electrode of the second battery pack 103.

A negative electrode of the second battery pack 103 is connected with the grounding terminal 107.

A first terminal of the first switch 105 is connected with the power supply terminal 101. A second terminal of the first switch 105 is connected with a first terminal of the second switch 106.

A second terminal of the second switch 106 is connected with the grounding terminal 107.

The voltage transformation unit 104 is connected between the negative electrode of the first battery pack 102 and the second terminal of the first switch 105.

A deviation between a rated voltage of the first battery pack 102 and a rated voltage of the second battery pack 103 is less than a first preset range; and/or a deviation between a ratio of a capacity of the first battery pack 102 to a capacity of the second battery pack 103 and a ratio of a maximum discharge rate of the second battery pack 103 to a maximum discharge rate of the first battery pack 102 is less than a second preset threshold.

In this embodiment of the present disclosure, the battery circuit is provided, which includes the power supply terminal, the first battery pack, the second battery pack of a different type from the first battery pack, the voltage transformation unit, the first switch, the second switch, and the grounding terminal. The positive electrode of the first battery pack is connected with the power supply terminal. The negative electrode of the first battery pack is connected with the positive electrode of the second battery pack. The negative electrode of the second battery pack is connected with the grounding terminal. The first terminal of the first switch is connected with the power supply terminal. The second terminal of the first switch is connected with the first terminal of the second switch. The second terminal of the second switch is connected with the grounding terminal. The voltage transformation unit is connected between the negative electrode of the first battery pack and the second terminal of the first switch. The deviation between the rated voltage of the first battery pack and the rated voltage of the second battery pack is less than the first preset range. The deviation between the ratio of the capacity of the first battery pack to the capacity of the second battery pack and the ratio of the maximum discharge rate of the second battery pack to the maximum discharge rate of the first battery pack is less than the second preset range. According to the battery circuit provided in this embodiment of the present disclosure, a hardware circuit foundation is provided for controlling a dual battery pack including the first battery pack and the second battery pack.

In this embodiment of the present disclosure, in a case that the battery circuit 100 is in a discharging state, the power supply terminal 101 in the battery circuit 100 is configured to connect to a power input terminal of a load, and the grounding terminal 107 in the battery circuit 100 is configured to connect to a grounding terminal 107 of the load. Exemplarily, the load may be a motor of an electric vehicle or a hybrid vehicle.

Alternatively, in a case that the battery circuit 100 is in a charging state, the power supply terminal 101 in the battery circuit 100 is configured to connect to a power output terminal of a charging device, and the grounding terminal 107 in the battery circuit 100 is configured to connect to a grounding terminal 107 of the charging device. Exemplarily, the charging device may be a charging pile or a braking system of an electric vehicle or a hybrid vehicle.

Figure 4:
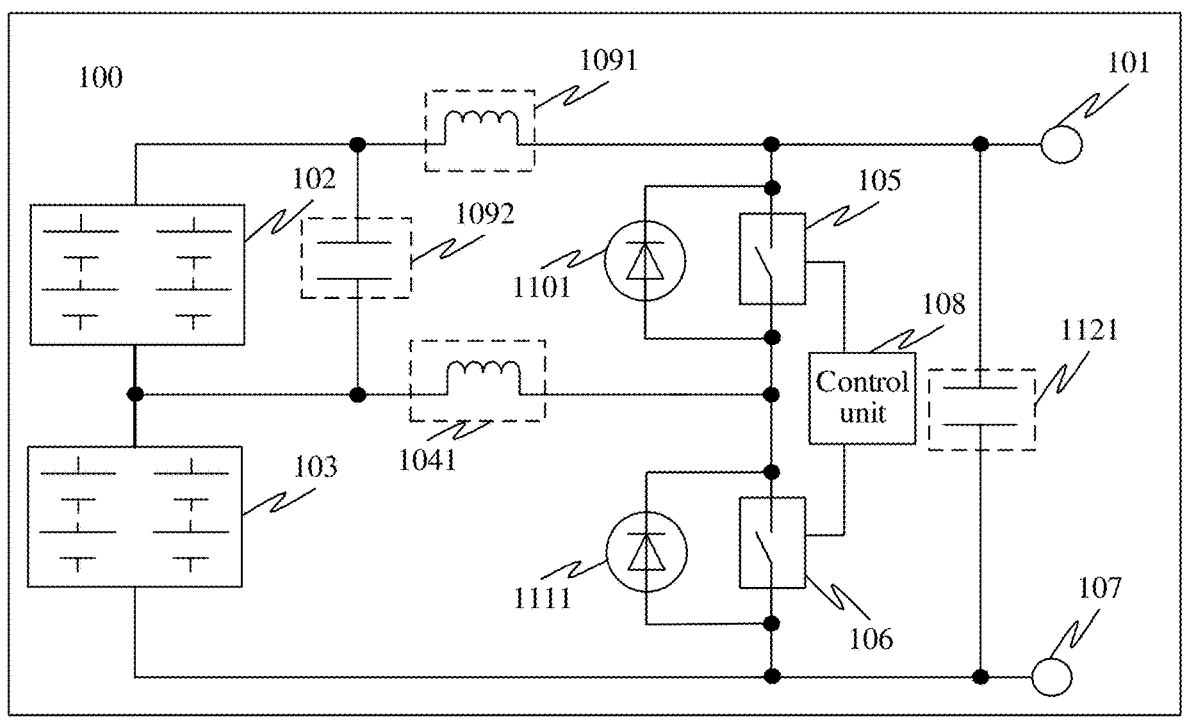
FIG. 4 is a schematic structural diagram IV of the battery circuit according to an embodiment of the present disclosure.

In an embodiment of the present disclosure, as shown in FIG. 4, the voltage transformation unit 104 may be a second inductor 1041. Certainly, the voltage transformation unit 104 may be implemented in another manner.

In an embodiment of the present disclosure, an inductance value of the second inductor 1041 may be set to a range of 2 μH to 1500 ρH.

In this embodiment of the present disclosure, the voltage transformation unit 104 has a low cost and a simple structure in a case that the voltage transformation unit 104 comprises the second inductor 1041.

In an embodiment of the present disclosure, the first switch 105 and the second switch 106 may be a switch IC, a metal oxide semiconductor field effect transistor (MOS-FET), an insulated gate bipolar transistor (IGBT), a silicon carbide (SiC) switch, or the like.

It may be understood that the first switch 105 further includes a control terminal configured to control the first switch 105 to be closed and opened. Similarly, the second switch 106 further includes a control terminal configured to control the second switch 106 to be closed and opened.

In this embodiment of the present disclosure, the first battery pack 102 and the second battery pack 103 are of different types. Specifically, the first battery pack 102 comprises a power-type battery pack, and the second battery pack 103 comprises an energy-type battery pack. Alternatively, the first battery pack 102 comprises an energy-type battery pack, and the second battery pack 103 comprises a power-type battery pack.

In this embodiment of the present disclosure, the power-type battery pack is a battery pack with a high power density. The power density is a maximum energy transfer power during charging or discharging of a battery with a unit weight or volume. In addition, in this embodiment of the present disclosure, a voltage value of the power-type battery pack may be set to a range of 100 V to 1000 V.

The energy-type battery pack is a battery pack with a high energy density. The energy density is energy stored in a battery with a unit weight or volume. In addition, in this embodiment of the present disclosure, a voltage value of the energy-type battery pack may be set to a range of 100 V to 1000 V.

In this embodiment of the present disclosure, specific types of the first battery pack 102 and the second battery pack 103 are not limited, which can improve compatibility of the battery circuit 100 provided in the embodiments of the present disclosure.

In this embodiment of the present disclosure, a deviation between a rated voltage U1 of the first battery pack 102 and a rated voltage U2 of the second battery pack 103 is less than a first preset range.

In this embodiment of the present disclosure, the first preset range is an allowable range of the deviation between the rated voltage U1 of the first battery pack 102 and the rated voltage U3 of the second battery pack 103. In a case that the deviation between the rated voltage U1 of the first battery pack 102 and the rated voltage U2 of the second battery pack 103 is less than the first preset range, it indicates that the rated voltage U1 of the first battery pack 102 is substantially the same as the rated voltage U2 of the second battery pack 103.

In an embodiment of the present disclosure, the first preset range may exemplarily be 0.2*U1 or 0.2*U2. In a case that the first preset range is 0.2*U1, 1.2*U1≥U2≥0.8*U1. In a case that the first preset range is 0.2*U2, 1.2*U2≥U1≥0.8*U2.

It should be noted that, a specific value of the first preset range is not limited in this embodiment of the present disclosure.

In this embodiment of the present disclosure, in a case that the deviation between the rated voltage U1 of the first battery pack 102 and the rated voltage U2 of the second battery pack 103 is less than the first preset range, efficient energy transfer can be achieved between the first battery pack 102 and the second battery pack 103. For example, efficient mutual charging can be achieved between the first battery pack 102 and the second battery pack 103.

It should be noted that, generally, a sum of the rated voltage U1 of the first battery pack 102 and the rated voltage U1 of the second battery pack 103 is equal to a total voltage Uout required for the load, that is, U1+U2=Uout.

In an embodiment of the present disclosure, the rated voltage U1 of the first battery pack 102 is the same as the rated voltage U2 of the second battery pack 103. In this way, most efficient energy transfer can be achieved between the first battery pack 102 and the second battery pack 103.

Based on the above, in an example, Uout=550V. In this case, U1=U2=275V may be set.

In this embodiment of the present disclosure, a deviation between a ratio of a capacity Q1 of the first battery pack 102 to a capacity Q2 of the second battery pack 103 and a ratio of a maximum discharge rate X2 of the second battery pack 103 to a maximum discharge rate X1 of the first battery pack 102 is less than a second preset range.

The maximum discharge rate represents a ratio of a maximum discharging current of the battery pack to a battery capacity. For example, if a maximum discharging current of a battery pack with a battery capacity of 10 Ah is 50 A, a maximum discharge rate thereof is 50 A/10 Ah=5 C.

In this embodiment of the present disclosure, the second preset range is an allowable range of the deviation between the ratio of the capacity Q1 of the first battery pack 102 to the capacity Q2 of the second battery pack 103 and the ratio of the maximum discharge rate X2 of the second battery pack 103 to the maximum discharge rate X1 of the first battery pack 102. In a case that the deviation between the ratio of the capacity Q1 of the first battery pack 102 to the capacity Q2 of the second battery pack 103 and the ratio of the maximum discharge rate X2 of the second battery pack 103 to the maximum discharge rate X1 of the first battery pack 102 is less than the second preset range, it indicates that the ratio of the capacity Q1 of the first battery pack 102 to the capacity Q2 of the second battery pack 103 is substantially the same as the ratio of the maximum discharge rate X2 of the second battery pack 103 to the maximum discharge rate X1 of the first battery pack 102.

In an embodiment of the present disclosure, the second preset range may exemplarily be ±0.5.

It should be noted that, a specific value of the second preset range is not limited in this embodiment of the present disclosure.

In this embodiment of the present disclosure, in a case that the deviation between the ratio of the capacity of the first battery pack 102 to the capacity of the second battery pack 103 and the ratio of the maximum discharge rate of the second battery pack 103 to the maximum discharge rate of the first battery pack 101 is less than the second preset range, maximum discharging currents of the two battery packs can be substantially the same. Based on the above, for example, the two battery packs can be connected in series for stable discharging.

It should be noted that, generally, a sum of the capacity Q1 of the first battery pack 102 and the capacity Q2 of the second battery pack 103 is equal to a total capacity Qnom required for the load, that is, Q1+Q2=Qnom.

In an embodiment of the present disclosure, the ratio of the capacity Q1 of the first battery pack 102 to the capacity Q2 of the second battery pack 103 is the same as the ratio of the maximum discharge rate X2 of the second battery pack 103 to the maximum discharge rate X1 of the first battery pack 102. In this way, the maximum discharging currents of the two battery packs can be exactly the same.

Based on the above, in an example, Qnom=120 Ah. In this case, Q1=100 Ah, Q2=20 Ah, X1=1 C, and X2=5 C may be set.

The battery circuit 100 shown in FIG. 1 provided in the embodiments of the present disclosure provides a hardware foundation for controlling a dual battery pack including a power-type battery pack and an energy-type battery pack. Specifically, according to the battery circuit shown in FIG. 1, the dual battery pack including the power-type battery pack and the energy-type battery pack may be controlled as follows.

Figure 2:
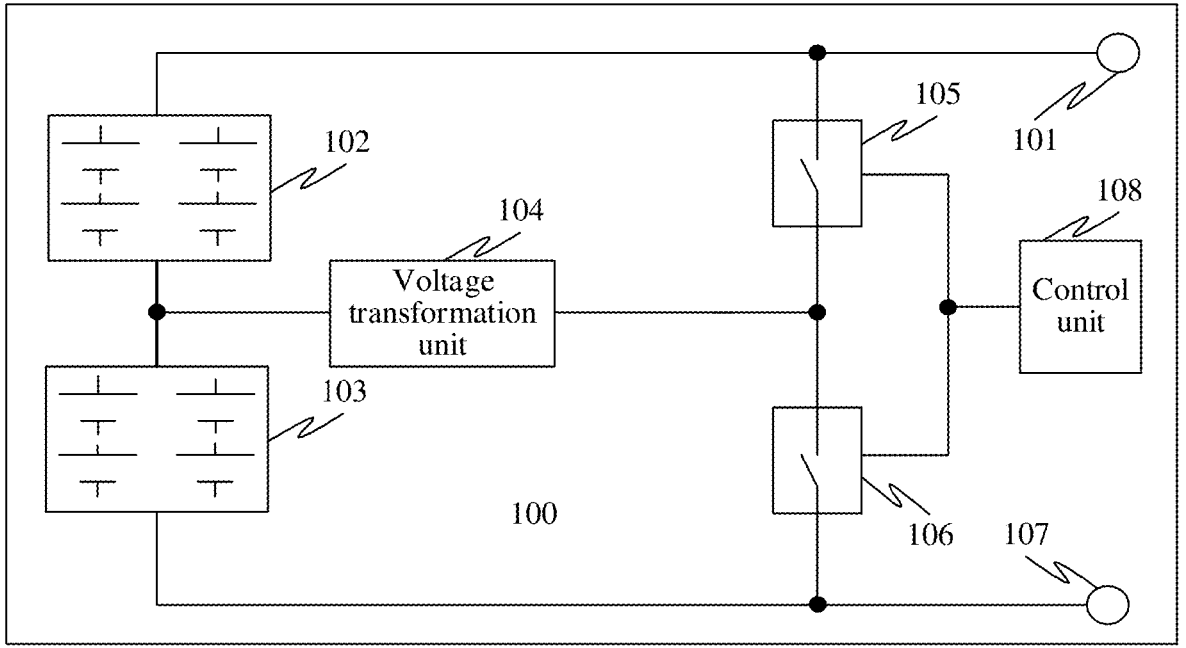
FIG. 2 is a schematic structural diagram II of the battery circuit according to an embodiment of the present disclosure.

To achieve the control of the first switch 105 and the second switch 106, as shown in FIG. 2, the battery circuit 100 further includes a control unit 108.

A first terminal of the control unit 108 is connected with a control terminal of the first switch 105. A second terminal of the control unit 108 is connected with a control terminal of the second switch 106.

In an embodiment of the present disclosure, the control unit 108 may exemplarily be a central processing unit (CPU), a microcontroller unit (MCU), or the like.

The control unit 108 is configured to control the first switch 105 and the second switch 106 to be opened or closed according to a first preset control rule under a first preset condition, to cause an output power of the second battery pack 103 to increase.

In this embodiment, the first preset condition may be that the battery circuit 100 is in a discharging state. The first preset control rule may be associated with performing a first on/off operation, which includes: controlling the first switch 105 to be opened and the second switch 106 to be closed within a first preset time period, and controlling the first switch 105 to be closed and the second switch 106 to be opened within a second preset time period. The first on/off operation is repeated until the first battery pack 102 is open circuited.

In this embodiment, the second preset time period is a time period adjacent to the first preset time period and after the first preset time period. Durations corresponding to the first preset time period and the second preset time period may be set according to past experience or otherwise.

In this embodiment, in a case that the battery circuit 100 is in the discharging state, the first switch 105 is controlled to be opened and the second switch 106 is controlled to be closed within the first preset time period. In this case, the second battery pack 103 charges the voltage transformation unit 104. The first switch 105 is controlled to be closed and the second switch 106 is controlled to be opened within the second preset time period. In this case, the voltage transformation unit 104 releases the stored power. In other words, a voltage at the output terminal of the voltage transformation unit 104 (a terminal connected to the first switch 105) rises. The process is repeated. When the voltage at the output terminal of the voltage transformation unit 104 rises to a same voltage as a bus voltage, the first battery pack 102 is open circuited. In this way, only the second battery pack 103 is discharged, and the power outputted by the second battery pack 103 is greater than the power outputted by the second battery pack 103. In other words, the output power of the second battery pack 103 is increased.

The control unit 108 is further configured to control the first switch 105 and the second switch 106 to be opened or closed according to a second preset control rule under a second preset condition, so that an input power of the first battery pack 102 is different from an input power of the second battery pack 103.

In this embodiment, the second preset condition may be that the battery circuit 100 is in a charging state. The second preset control rule may be associated with performing a second on/off operation, which includes controlling the first switch 105 to be closed and the second switch 106 to be opened within a third preset time period and controlling the first switch 105 to be opened and the second switch 106 to be closed within a fourth preset time period. The second on/off operation is repeated.

In this embodiment, the fourth preset time period is a time period adjacent to the third preset time period and after the third preset time period. Durations corresponding to the third preset time period and the fourth preset time period may be set according to past experience or otherwise.

In this embodiment, in a case that the battery circuit 100 is in the charging state, the first switch 105 is controlled to be closed and the second switch 106 is controlled to be opened within the third preset time period. In this case, the first battery pack 102 and/or a charging device charges the voltage transformation unit 104. The first switch 105 is controlled to be opened and the second switch 106 is controlled to be closed within the fourth preset time period. In this case, the voltage transformation unit 104 releases the stored power to charge the second battery pack 103 together with the charging device. In other words, the voltage transformation unit 104 implements a boosting function. Since the first battery pack 102 is charged only by the charging device, while the second battery pack 103 is jointly charged by the voltage transformation unit 104 and the same charging device, by repeating the process, an input power of the second battery pack 103 can be greater than the input power of the first battery pack 102. In other words, the input power of the second battery pack 103 is different from the input power of the first battery pack 102.

It may be understood that, in a case that the second preset control rule is a control rule opposite to repeating the second on/off operation, the first switch 105 is controlled to be opened and the second switch 106 is controlled to be closed within the third preset time period, and the first switch 105 is controlled to be closed and the second switch 106 is controlled to be opened within the fourth preset time period. The operation is repeated. In this way, the input power of the first battery pack 102 can be greater than the input power of the second battery pack 103. In other words, the input power of the second battery pack 103 is different from the input power of the first battery pack 102.

The control unit 108 is further configured to control the first switch 105 and the second switch 106 to be opened or closed according to a third preset control rule under a third preset condition, to cause the first battery pack 102 to charge the second battery pack 103 or cause the second battery pack 103 to charge the first battery pack 102.

In this embodiment, the third preset condition may be that a charging current of the second battery pack 103 is less than a maximum charging current of the second battery pack 103. Correspondingly, the third preset control rule is associated with performing a third on/off operation, which includes controlling the first switch 105 to be closed and the second switch 106 to be opened within a fifth preset time period and controlling the first switch 105 to be opened and the second switch 106 to be closed within a sixth preset time period. The third on/off operation is repeated.

In this embodiment, the sixth preset time period is a time period adjacent to the fifth preset time period and after the fifth preset time period. Durations corresponding to the fifth preset time period and the sixth preset time period may be set according to past experience or otherwise.

In this embodiment, in a case that the charging current of the second battery pack 103 is less than the maximum charging current of the second battery pack 103, the first switch 105 is controlled be to be closed and the second switch 106 is controlled to be opened within the fifth preset time period. In this case, the first battery pack 102 charges the voltage transformation unit 104. The first switch 105 is controlled to be opened and the second switch 106 is controlled to be closed within the sixth preset time period. In this case, the voltage transformation unit 104 releases the stored power to the second battery pack 103. In other words, the voltage transformation unit 104 implements a boosting function. The process is repeated, so that the first battery pack 102 can charge the second battery pack 103.

It should be understood that, in a case that the third preset condition is that a charging current of the first battery pack 102 is less than a maximum charging current of the first battery pack 102, correspondingly, the third preset control rule is a control rule opposite to repeating the third on/off operation. To be specific, the first switch 105 is controlled to be opened and the second switch 106 is controlled to be closed within the fifth preset time period, and the first switch 105 is controlled to be closed and the second switch 106 is controlled to be opened within the sixth preset time period. The operation is repeated. In this way, the second battery pack 103 can charge the first battery pack 102.

The control unit 108 is further configured to control the first switch 105 and the second switch 106 to be opened under a fourth preset condition, to connect the first battery pack 102 and the second battery pack 103 in series for discharging or charging.

In this embodiment, the fourth preset condition is that the battery circuit 100 is in a discharging state or a charging state. The first switch 105 and the second switch 106 are controlled to be opened under the fourth preset condition. In this way, the first battery pack 102 and the second battery pack 103 are jointly discharged or charged.

Based on the above, the embodiments of the present disclosure provide multiple types of control according to the battery circuit shown in FIG. 1.

In this embodiment of the present disclosure, the battery circuit is provided, which includes the power supply terminal, the first battery pack, the second battery pack of a different type from the first battery pack, the voltage transformation unit, the first switch, the second switch, and the grounding terminal. The positive electrode of the first battery pack is connected with the power supply terminal. The negative electrode of the first battery pack is connected with the positive electrode of the second battery pack. The negative electrode of the second battery pack is connected with the grounding terminal. The first terminal of the first switch is connected with the power supply terminal. The second terminal of the first switch is connected with the first terminal of the second switch. The second terminal of the second switch is connected with the grounding terminal. The voltage transformation unit is connected between the negative electrode of the first battery pack and the second terminal of the first switch. The deviation between the rated voltage of the first battery pack and the rated voltage of the second battery pack is less than the first preset range. The deviation between the ratio of the capacity of the first battery pack to the capacity of the second battery pack and the ratio of the maximum discharge rate of the second battery pack to the maximum discharge rate of the first battery pack is less than the second preset range. According to the battery circuit provided in this embodiment of the present disclosure, a hardware circuit foundation is provided for controlling a dual battery pack including the first battery pack and the second battery pack.

Figure 3:
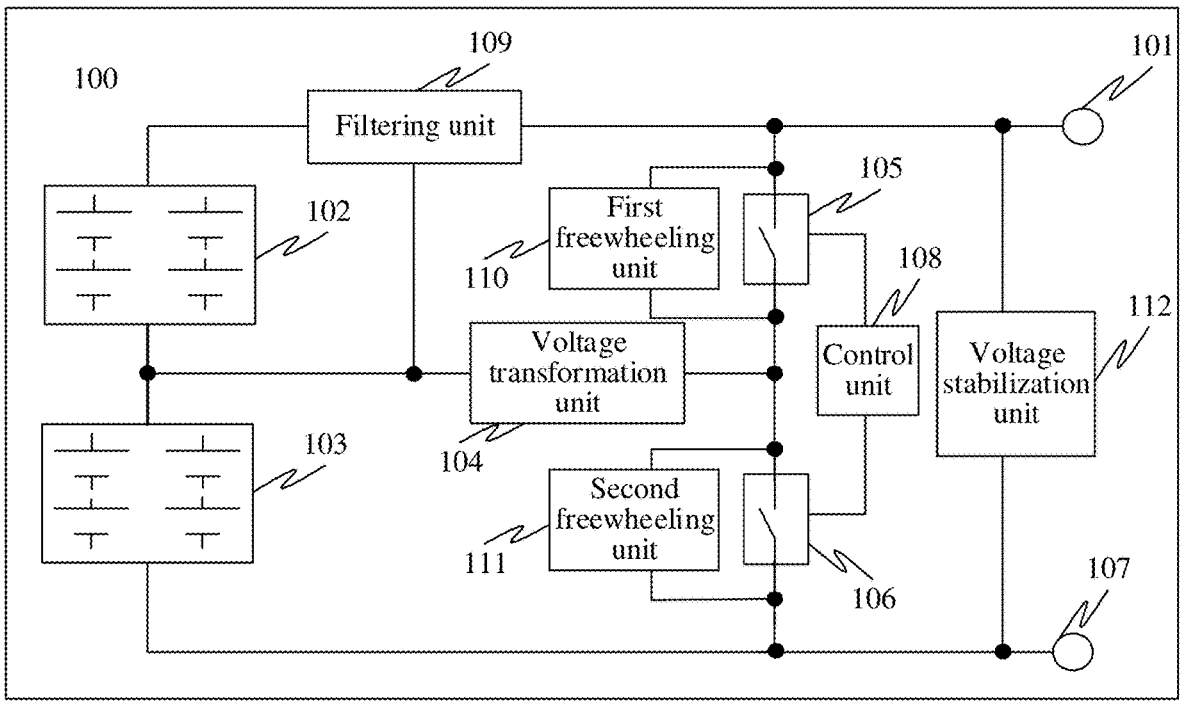
FIG. 3 is a schematic structural diagram III of the battery circuit according to an embodiment of the present disclosure.

In an embodiment of the present disclosure, in a case that the first battery pack 102 is a power-type battery pack and the second battery pack 103 is an energy-type battery pack, as shown in FIG. 3, the battery circuit 100 provided in this embodiment of the present disclosure further includes a filtering unit 109.

A first terminal of the filtering unit 109 is connected with the positive electrode of the first battery pack 102. A second terminal of the filtering unit 109 is connected with the power supply terminal 101. A third terminal of the filtering unit 109 is connected with the negative electrode of the first battery pack 102.

In this embodiment of the present disclosure, since the power-type battery pack is usually used in a case that a peak power is generated during the traveling of the electric vehicle or the hybrid vehicle (such as the peak discharging power generated during traction and the peak charging power generated during the braking), in other cases, an output current of the power-type battery pack is expected to be 0. In these cases, arranging the filtering unit 109 can suppress a current ripple of the first battery pack 102, to prevent the output current of the power-type battery pack (the first battery pack 102) from fluctuating around 0. In this way, high-frequency rapid charging/discharging of the first battery pack 102 can be avoided, thereby reducing the issue of a shortened lifespan of the first battery pack 102.

In an embodiment of the present disclosure, as shown in FIG. 4, the filtering unit 109 includes a first inductor 1091 and a first capacitor 1092.

A first terminal of the first inductor 1091 is connected with the positive electrode of the first battery pack 102. A second terminal of the first inductor 1091 is connected with the power supply terminal.

A first terminal of the first capacitor 1092 is connected with the first terminal of the first inductor 1091. A second terminal of the first capacitor 1092 is connected with the negative electrode of the first battery pack 102.

Certainly, a filtering unit 109 of another structure may also be used, which is not described in detail in this embodiment of the present disclosure.

In this embodiment of the present disclosure, the first inductor 1091 is a filter inductor, and the first inductor 1091 may be configured with a value in a range of 2 µH to 1500 µH. The first capacitor 1092 is a filter capacitor, the first capacitor 1092 may be configured with a value a range of 2 µF to 1500 µF.

It should be noted that, in a case that the first battery pack 102 has a filtering function, the first inductor 1091 and the first capacitor 1092 may be configured with relatively small values. For example, the first inductor 1091 may be configured with a value of 2 µH, and the first capacitor 1092 may be configured with a value of 2 µF.

Correspondingly, in a case that the first battery pack 102 does not have the filtering function, the first inductor 1091 and the first capacitor 1092 may be configured with relatively large values. For example, the first inductor 1091 may be configured with a value of 1500 µH, and the first capacitor 1092 may be configured with a value of 1500 µF.

In this embodiment of the present disclosure, the filtering unit 109 with a simple structure is provided, which can reduce hardware costs, design difficulty, and a footprint of the battery circuit 100.

In an embodiment of the present disclosure, as shown in FIG. 3, the battery circuit 100 provided in this embodiment of the present disclosure further includes a first freewheeling unit 110 and a second freewheeling unit 111.

An input terminal of the first freewheeling unit 110 is connected with the second terminal of the first switch 105. An output terminal of the first freewheeling unit 110 is connected with the first terminal of the first switch 105.

An input terminal of the second freewheeling unit 111 is connected with the second terminal of the second switch 106. An output terminal of the second freewheeling unit 111 is connected with the first terminal of the second switch 106.

In this embodiment of the present disclosure, at an initial moment of closing the second switch 106 and opening the first switch 105, the first switch 105 usually cannot be controlled to be immediately opened as a result of freewheeling time and action time of the first switch 105. As a result, a short circuit quickly occurs between the first switch 105 and the second switch 106, which causes the first battery pack 102 and the second battery pack 103 to be burnt.

In this embodiment of the present disclosure, the second freewheeling unit 111 is connected in parallel with the two terminals of the second switch 106, and the second freewheeling unit 111 performs freewheeling. In this way, closing time of the second switch 106 can be delayed during control of the first switch 105 to be opened, thereby preventing the first battery pack 102 and the second battery pack 103 from being burnt by a short circuit.

Similarly, in this embodiment of the present disclosure, the first freewheeling unit 110 is connected in parallel with the two terminals of the first switch 105, and the first freewheeling unit 110 performs freewheeling. In this way, closing time of the first switch 105 can be delayed during control of the second switch 106 to be opened, thereby preventing the first battery pack 102 and the second battery pack 103 from being burnt by a short circuit.

In an embodiment of the present disclosure, as shown in FIG. 4, the first freewheeling unit 109 is a first diode 1101, and the second freewheeling unit 111 is a second diode 1111.

An anode of the first diode 1101 is connected with the second terminal of the first switch 105. A cathode of the first diode 1101 is connected with the first terminal of the first switch 105.

An anode of the second diode 1111 is connected with the second terminal of the second switch 106. A cathode of the second diode 1111 is connected with the first terminal of the second switch 106.

In this embodiment of the present disclosure, the first freewheeling unit 110 and the second freewheeling unit 111 with a simple structure are provided, which can reduce hardware costs, design difficulty, and a footprint of the battery circuit 100.

In an embodiment of the present disclosure, as shown in FIG. 3, the battery circuit 100 provided in this embodiment of the present disclosure further includes a voltage stabilization unit 112.

The voltage stabilization unit 112 is connected between the power supply terminal 101 and the grounding terminal 107.

In this embodiment of the present disclosure, the voltage stabilization unit 111 is configured to filter out a voltage fluctuation on a bus, that is, a line on which the power supply terminal 101 of the battery circuit 100 is located, which can stabilize a voltage supplied to the load, and is further configured to reduce negative impact of a voltage fluctuation jointly generated by the first battery pack 102 and the voltage transformation unit 104 on the second battery pack 103.

In an embodiment of the present disclosure, as shown in FIG. 4, the voltage stabilization unit 112 may exemplarily be a second capacitor 1121. Certainly, the voltage stabilization unit 112 may be implemented in another manner.

In an embodiment of the present disclosure, the second capacitor 1121 is a support capacitor, and the second capacitor 1121 may be configured with a value in a range of 2 µF to 1500 µF.

In this embodiment of the present disclosure, the voltage stabilization unit 112 with a simple structure is provided, which can reduce hardware costs, design difficulty, and a footprint of the battery circuit 100.

An embodiment of the present disclosure further provides a vehicle. The vehicle includes the battery circuit 100 in any of the foregoing embodiments.

In this embodiment of the present disclosure, the vehicle includes an electric vehicle or a hybrid vehicle.

The embodiments of the present disclosure have been described above. The above description is exemplary and non-exhaustive, and the present disclosure is not limited to the disclosed embodiments. Many modifications and changes made without departing from the scope and the spirit of the various embodiments are apparent to a person of ordinary skill in the art. The selection of the terms used herein is intended to provide best explanation of the principles, practical applications of the various embodiments, or technical improvements of the technologies in the market, or to enable others of ordinary skill in the art to understand the embodiments disclosed herein. The scope of the present disclosure is defined by the appended claims.

What is claimed is:

1. A battery circuit, comprising a power supply terminal, a first battery pack, a second battery pack of a different type from the first battery pack, a voltage transformation unit, a first switch, a second switch, a control unit and a grounding terminal, wherein:

a positive electrode of the first battery pack is connected with the power supply terminal;

a negative electrode of the first battery pack is connected with a positive electrode of the second battery pack;

a negative electrode of the second battery pack is connected with the grounding terminal;

a first terminal of the first switch is connected with the power supply terminal;

a second terminal of the first switch is connected with a first terminal of the second switch;

a second terminal of the second switch is connected with the grounding terminal;

the control unit coupled to the first switch and the second switch; and the voltage transformation unit is connected between the negative electrode of the first battery pack and the second terminal of the first switch;

wherein a deviation between a rated voltage of the first battery pack and a rated voltage of the second battery pack is less than a first preset range; and/or a deviation between a ratio of a capacity of the first battery pack to a capacity of the second battery pack and a ratio of a maximum discharge rate of the second battery pack to a maximum discharge rate of the first battery pack is less than a second preset range, wherein the control unit is configured to:

control the first switch and the second switch to be opened or closed according to a first preset control rule under a discharge condition, to cause an output power of the second battery pack to increase, wherein the first preset control rule is associated with performing a first operation comprising:

controlling the first switch to be opened and the second switch to be closed within a first preset time period; and controlling the first switch to be closed and the second switch to be opened within a second preset time period, wherein the second preset time period is adjacent to the first preset time period and after the first preset time period, and wherein the first operation is repeated until the first battery pack is open circuited; and control the first switch and the second switch to be opened or closed according to a second preset control rule under a charging condition, so that an input power of the first battery pack is different from an input power of the second battery pack.

2. The battery circuit according to claim 1, wherein the rated voltage of the first battery pack is same as the rated voltage of the second battery pack; and/or the ratio of the capacity of the first battery pack to the capacity of the second battery pack is the same as the ratio of the maximum discharge rate of the second battery pack to the maximum discharge rate of the first battery pack.

3. The battery circuit according to claim 1, wherein the control unit is configured to:

control the first switch and the second switch to be opened or closed according to a third preset control rule under a third preset condition, to cause the first battery pack to charge the second battery pack or cause the second battery pack to charge the first battery pack; and/or control the first switch and the second switch to be opened under a fourth preset condition, to connect the first battery pack and the second battery pack in series for discharging or charging.

4. The battery circuit according to claim 1, wherein the first battery pack comprises a power-type battery pack; and the second battery pack comprises an energy-type battery pack; or the first battery pack comprises the energy-type battery pack; and the second battery pack comprises the power-type battery pack.

5. The battery circuit according to claim 4, wherein the first battery pack comprises a power-type battery pack; the second battery pack comprises energy-type battery pack; and the battery circuit further comprises a filtering unit, wherein:

a first terminal of the filtering unit is connected with the positive electrode of the first battery pack; a second terminal of the filtering unit is connected with the power supply terminal; and a third terminal of the filtering unit is connected with the negative electrode of the first battery pack.

6. The battery circuit according to claim 5, wherein the filtering unit comprises a first inductor and a first capacitor, wherein:

a first terminal of the first inductor is connected with the positive electrode of the first battery pack; a second terminal of the first inductor is connected with the power supply terminal; a first terminal of the first capacitor is connected with the first terminal of the first inductor; and a second terminal of the first capacitor is connected with the negative electrode of the first battery pack.

7. The battery circuit according to claim 1, further comprising a first freewheeling unit and a second freewheeling unit, wherein:

an input terminal of the first freewheeling unit is connected with the second terminal of the first switch; an output terminal of the first freewheeling unit is connected with the first terminal of the first switch;

an input terminal of the second freewheeling unit is connected with the second terminal of the second switch; and an output terminal of the second freewheeling unit is connected with the first terminal of the second switch.

8. The battery circuit according to claim 7, wherein the first freewheeling unit is a first diode; and the second freewheeling unit is a second diode, wherein:

an anode of the first diode is connected with the second terminal of the first switch;

a cathode of the first diode is connected with the first terminal of the first switch;

an anode of the second diode is connected with the second terminal of the second switch; and a cathode of the second diode is connected with the first terminal of the second switch.

9. The battery circuit according to claim 1, further comprising a voltage stabilization unit, wherein:

the voltage stabilization unit is connected between the power supply terminal and the grounding terminal.

10. The battery circuit according to claim 9, wherein the voltage stabilization unit comprises a second capacitor.

11. The battery circuit according to claim 1, wherein the voltage transformation unit comprises a second inductor.

12. A vehicle, comprising a battery circuit coupled to a motor, the battery circuit comprising a power supply terminal, a first battery pack, a second battery pack of a different type from the first battery pack, a voltage transformation unit, a first switch, a second switch, a control unit and a grounding terminal, wherein:

a positive electrode of the first battery pack is connected with the power supply terminal;

a negative electrode of the first battery pack is connected with a positive electrode of the second battery pack;

a negative electrode of the second battery pack is connected with the grounding terminal;

a first terminal of the first switch is connected with the power supply terminal; a second terminal of the first switch is connected with a first terminal of the second switch;

a second terminal of the second switch is connected with the grounding terminal;

the control unit coupled to the first switch and the second switch; and the voltage transformation unit is connected between the negative electrode of the first battery pack and the second terminal of the first switch;

and wherein a deviation between a rated voltage of the first battery pack and a rated voltage of the second battery pack is less than a first preset range;

a deviation between a ratio of a capacity of the first battery pack to a capacity of the second battery pack and a ratio of a maximum discharge rate of the second battery pack to a maximum discharge rate of the first battery pack is less than a second preset range, wherein the control unit is configured to:

control the first switch and the second switch to be opened or closed according to a first preset control rule under a discharge condition, to cause an output power of the second battery pack to increase, wherein the first preset control rule is associated with performing a first operation comprising:

controlling the first switch to be opened and the second switch to be closed within a first preset time period; and controlling the first switch to be closed and the second switch to be opened within a second preset time period, wherein the second preset time period is adjacent to the first preset time period and after the first preset time period, and wherein the first operation is repeated until the first battery pack is open circuited; and control the first switch and the second switch to be opened or closed according to a second preset control rule under a charging condition, so that an input power of the first battery pack is different from an input power of the second battery pack.

13. The vehicle according to claim 12, wherein the motor is associated with an electric vehicle or a hybrid vehicle.

14. The vehicle according to claim 12, wherein the rated voltage of the first battery pack is same as the rated voltage of the second battery pack.

15. The vehicle according to claim 12, wherein the ratio of the capacity of the first battery pack to the capacity of the second battery pack is same as the ratio of the maximum discharge rate of the second battery pack to the maximum discharge rate of the first battery pack.

16. The vehicle according to claim 12, wherein the second preset control rule is associated with performing a second operation comprising:

controlling the first switch to be closed and the second switch to be opened within a third preset time period; and controlling the first switch to be opened and the second switch to be closed within a fourth preset time period, wherein the second operation is repeated, and the fourth preset time period is a time period adjacent to the third preset time period and after the third preset time period.

17. The vehicle according to claim 12, wherein the control unit is further configured to: control the first switch and the second switch to be opened or closed according to a third preset control rule under a third preset condition, to cause the first battery pack to charge the second battery pack or cause the second battery pack to charge the first battery pack.

18. The vehicle according to claim 12, wherein the control unit is further configured to: control the first switch and the second switch to be opened under a fourth preset condition, to connect the first battery pack and the second battery pack in series for discharging or charging.

19. The vehicle according to claim 12, wherein the first battery pack comprises a power-type battery pack; and the second battery pack comprises an energy-type battery pack; or the first battery pack comprises the energy-type battery pack; and the second battery pack comprises the power-type battery pack.

20. The vehicle according to claim 12, wherein the battery circuit further comprises a first freewheeling unit and a second freewheeling unit, and wherein:

an input terminal of the first freewheeling unit is connected with the second terminal of the first switch; an output terminal of the first freewheeling unit is connected with the first terminal of the first switch; and an input terminal of the second freewheeling unit is connected with the second terminal of the second switch; and an output terminal of the second freewheeling unit is connected with the first terminal of the second switch.

* * * * *